Aug. 9, 1938.　　D. C. BETTISON ET AL　　2,125,983
ELECTRICAL MEASURING INSTRUMENT
Filed June 6, 1936　　2 Sheets-Sheet 1
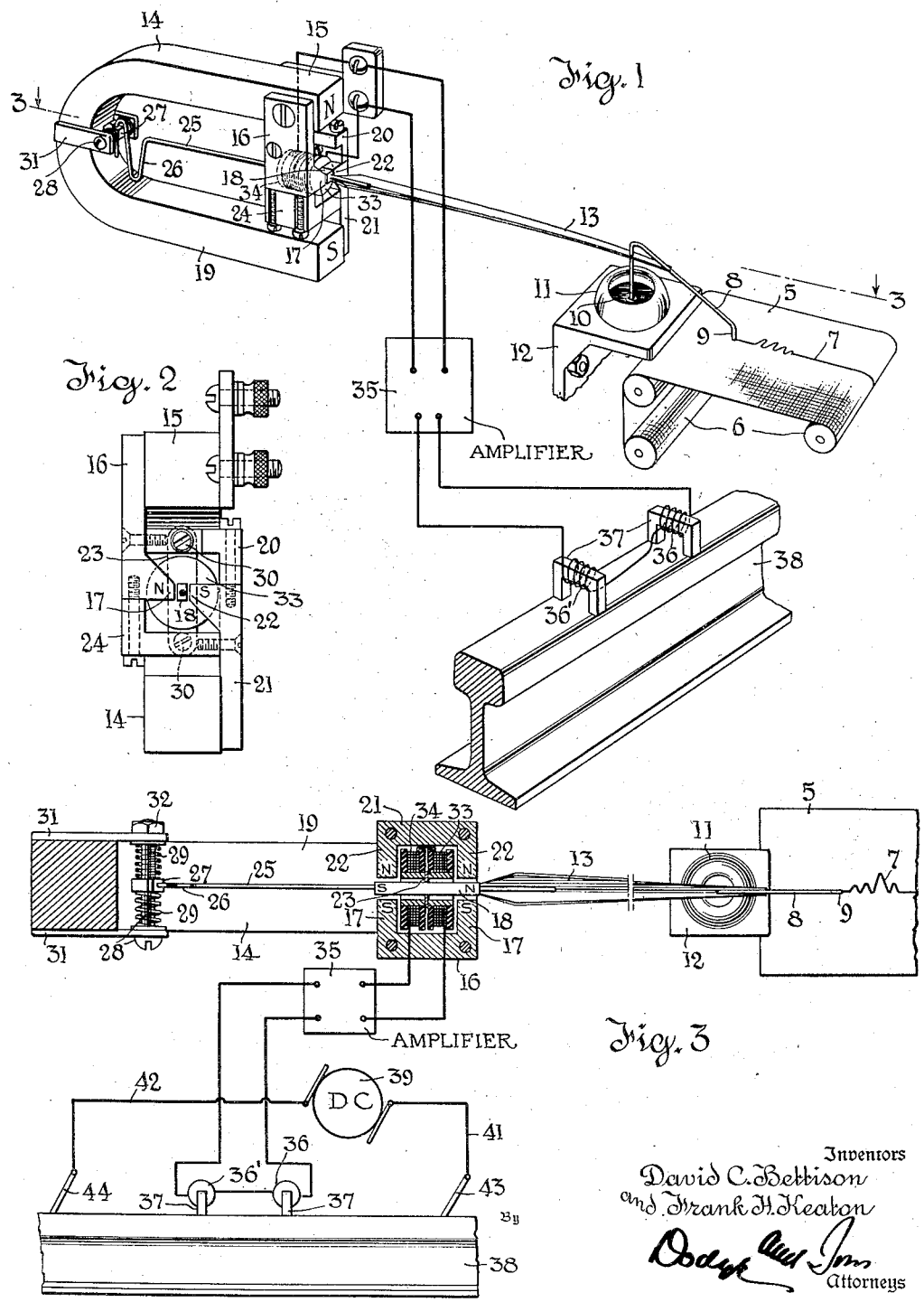
Inventors
David C. Bettison
and Frank H. Keaton
Attorneys Inventor
David C. Bettison
and Frank H. Keaton
By
Dodge
Attorneys Patented Aug. 9, 1938

2,125,983

UNITED STATES PATENT OFFICE 2,125,983

ELECTRICAL MEASURING INSTRUMENT

David C. Bettison and Frank H. Keaton, Omaha, Nebr.

Application June 6, 1936, Serial No. 84,005

2 Claims. (Cl. 171—95)

This invention relates to a galvanometer for use in association with rail flaw detectors.

In detectors of the type used for locating flaws or fissures in railroad rails, several types of apparatus have been developed for ascertaining the location and the presence of the flaws. One form of detecting apparatus which has met with success consists of a source of electric current carried on a railway car, and provided with detecting means whereby the circuit of said source is completed through the track rails upon which the car runs, and which are to be tested. Depending from the bottom of the car, and in close proximity to the rails, are two opposed exploring coils containing magnetic cores through which the flux associated with the magnetic field produced by the rail current flows. In circuit with the exploring coils is an amplifier for stepping up the E. M. F. generated in the exploring coils, and this amplifier has its output circuit connected to a relay mechanism carried on the car and arranged to actuate the recorder pen on a movable chart.

Whenever there is a variation or disturbance in the magnetic field surrounding a rail, the flux linkage with the exploring coils varies, and the variations of this linkage cause an E. M. F. to be induced in the circuit of the coils. The current which flows is amplified and passes through a relay, to cause a deflection of the pen of the recorder, and this produces on the chart an indication that such a variation has occurred. The variation in the magnetic field associated with the rail may result from the presence of fissures or simply by minor flaws in the rail. These flaws or defects may be of various types such as burns, slivers, or even residual magnetism in the rail.

In mechanism of the prior art, it has been considered essential to provide relay mechanism between the pick up or exploring apparatus and the recording apparatus. In other words, it has not been practicable to operate the recording mechanism directly from the amplifier associated with the exploring coils. Consequently, in apparatus of the prior art, it has not been possible to give individuality to the records, and these records could only indicate the presence of a flaw without giving any clue as to its character.

When a relay is interposed in the circuit, as described above, the recording pen produces a continuous straight line record so long as the current supplied to the relay is insufficient to cause the relay to pick up. However, when the current supplied to the relay, as an E. M. F., is generated in the exploring coils, is sufficient to cause the relay to pick up, the recording pen makes a deflection which is also of continuous amplitude regardless of the intensity of the current which causes the relay to pick up.

According to the present invention, it is proposed to so arrange the mechanism that the use of relays between the pick up apparatus and the recording apparatus is entirely done away with, and the output circuit of the amplifier is connected directly to the recorder. In other words, there is a direct connection between the pick up apparatus and the recording apparatus, except for the interposition of the usual amplifier. In this way, the recording apparatus may be made to give an accurate, continuous record of such a character that the deflections of the recorder shown, are approximately proportional to the E. M. F. generated in the exploring coils when a fissure or other flaw is encountered. Consequently, the amplitude or other characteristic of the chart record forms the means whereby the character or seriousness of the flaw may be determined through the mere examination of the record on the chart.

The invention will be more fully understood from a reading of the following specification in connection with the accompanying drawings in which one embodiment of this invention is illustrated.

In the drawings:

Figure 1 is a perspective view of one form of apparatus embodying this invention, and indicating how the recording mechanism is related to the exploring coils associated with the track rail;

Fig. 2 is an end elevation showing the magnetic structure of the recorder pen actuating mechanism;

Fig. 3 is a sectional view taken on the line 3—3 of Fig. 1, showing diagrammatically the electric circuits of the complete apparatus;

Figure 4:
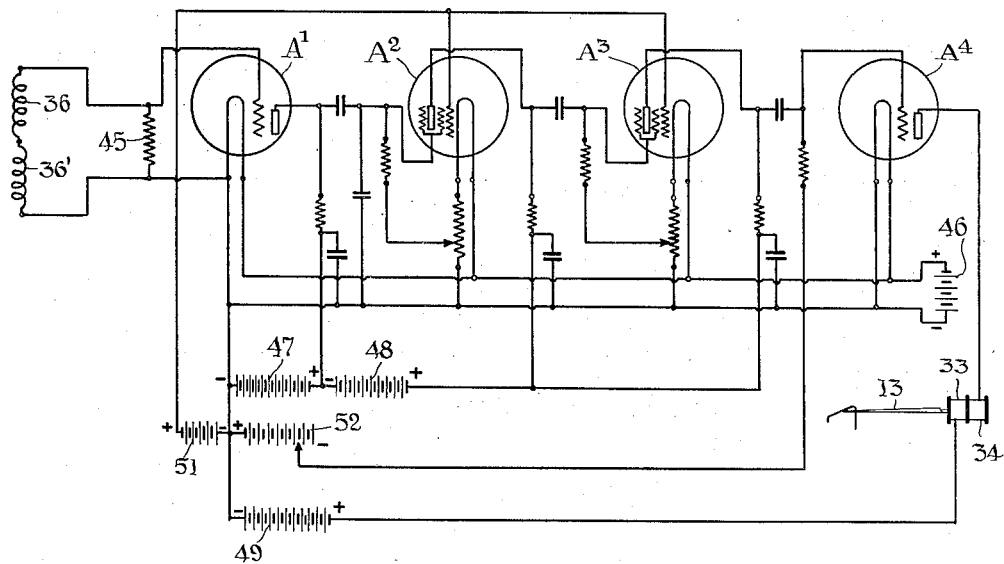
Fig. 4 is a circuit diagram showing the pick-up apparatus, the amplifier circuits and the connections of those circuits to the recording apparatus.

Referring to the drawings, the apparatus shown in Fig. 1 comprises a recording chart 5 adapted to be progressively driven by rolls 6 at a speed which, according to usual practice, will bear some fixed relation to the speed of travel of the car upon which the apparatus is carried. Consequently, the record made on the chart will indicate to some degree the location of any flaw which produces a variation in that record. Inasmuch as apparatus of this character is well known and common in the art, specific description will be unnecessary.

Associated with the chart 5, and adapted to produce a continuous record 7 thereon, is a pen 8, here shown in the form of a thin metal tube having one end 9 contacting with the chart, and the other end 10 placed below the surface of the ink in a receptacle 11 mounted on a suitable support 12. The pen 8 is carried by and secured to a pen arm 13 preferably of thin, light metal of trough-shape, in order to give it stiffness and rigidity, and at the same time keep its weight at a minimum. This recorder arm 13 is adapted to be actuated by suitable electromagnetic or galvanometer apparatus which is responsive to currents supplied to the fixed coils thereon.

The pen actuating or galvanometer mechanism comprises a permanent horseshoe magnet 14 having attached to each of its two projecting ends a set of bifurcated pole pieces. For example, the polar end 15 designated as the north pole has attached to it a pole piece 16 made up of two spaced projecting ends 17 located in close proximity to a movable magnetic armature 18. The south pole end 19 of the magnet carries a similar bifurcated pole piece 21 having two polar projections 22 also coming into proximity to the magnetic armature 18, but spaced from it on the side remote from the polar projections 17.

The armature 18 is carried by a torsion spring plate 23, this spring plate being mounted between the polar pieces 15 and 21 by L-shaped non-magnetic supports 20 and 24, as best shown in Fig. 2 of the drawings. The spring plate 23 is attached to these supports 20 and 24 by screws 30 and holds the armature 18 in balanced relation with respect to the north and south polar projections. Attached to the end of armature 18, remote from the point of attachment to the pen arm 13, is a biasing spring 25, this spring having its rear end reversely bent at 26 and secured to an adjustable nut 27. This nut is threaded on the shank of a screw 28, and the screw has a spring 29 on either side of the nut. This screw is supported on brackets 31 fixed on opposite faces of the horseshoe magnet at the closed end thereof, and the assembly of the biasing spring support is completed by a nut 32. The location for purposes of adjustment of the spring 25 may be altered by adjusting the nut 27 to vary the tension on the opposing springs 29. The springs 23 and 25 cooperate to hold the armature 18 accurately centered with respect to the pole pieces, and to restore the armature to centered position after each deflection.

Mounted between the polar projections 17 and 22 are two serially connected annular coils 33 and 34. These coils are carried on non-magnetic spools, and one coil is located on each side of the supporting spring 23. The coils surround the armature 18, and current may be supplied to these coils from the output of an amplifier 35, the input side of which is connected to opposed pick-up or exploring coils 36, 36', each of which has a magnetic core 37 in the vicinity of the track rail 38.

Figure 5:
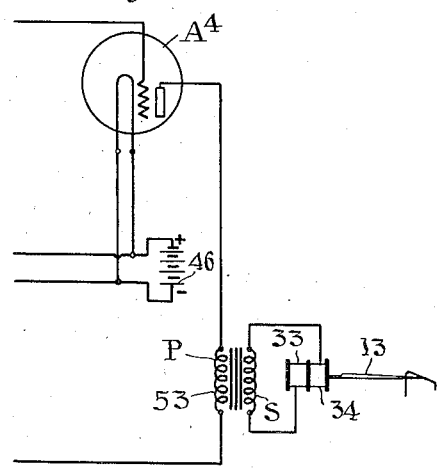
Fig. 5 is a fragmentary circuit diagram showing the recording apparatus connected to the amplifier output circuit through a transformer.
Figure 6:
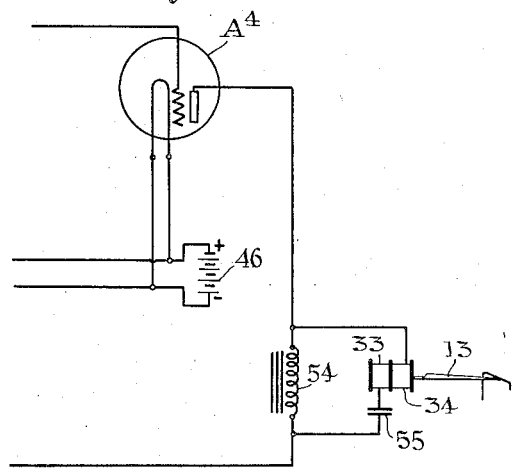
Fig. 6 is a diagram similar to that of Fig. 5, but illustrating a choke coil and condenser connection between the amplifier output circuit and the recording apparatus.

Direct current is supplied to the track rail from a suitable source, such as generator 39, connected to the rail through leads 41 and 42, and brushes 43 and 44. It will be understood that the amplifier 35 may be of any well known form, suitable for boosting the current supplied to its input circuit to a value sufficient to operate the recorder mechanism. One suitable form of amplifier circuit is shown in Fig. 4, and modified arrangements of the connections between the output circuit of the amplifier and the recorder are shown in Figs. 5 and 6. Inasmuch as electron tube amplifying circuits of various types are common and well known, only a brief description will be necessary to a proper understanding of this case.

Referring to the diagram of Fig. 4, the two opposed exploring coils 36, 36' are connected in series with the input circuit of a three-electrode amplifier tube $A^1$ of the amplifier circuit. Shunted across the coils 36, 36', is the usual resistor 45.

The amplifier circuit also includes, as here shown, two screen-grid type amplifier tubes $A^2$ and $A^3$, and a fourth tube $A^4$ of the three-electrode type. The filaments of all of the tubes are supplied with current from a source, such as battery 46. The plate of tube $A^1$ is supplied with potential from a battery 47, the plates of tubes $A^2$ and $A^3$ by a battery 48, and the plate of tube $A^4$ by a battery 49. Suitable grid biasing potential is supplied to tubes $A^2$ and $A^3$ by a battery 51, and to the grid of tube $A^4$ by a battery 52. Connected in the output circuit of tube $A^4$, along with the battery 49, are the coils 33 and 34 of the recording apparatus.

It will be understood that when electromotive forces are induced in the coils 36, 36', they will be amplified and supplied to the output circuit of the last tube $A^4$. The alternating current which flows in the output circuit will cause deflection of the pen arm 13 by an amount which varies in accordance with the value of the electromotive forces induced in the exploring coils.

In Fig. 4, the coils 33, 34 have been shown to be connected directly in the output circuit of the amplifier tube $A^4$, but it is to be understood that the recorder circuit may be coupled to the output circuit through a transformer 53, as shown in Fig. 5. In this arrangement, the primary P of the transformer is connected in series with the plate or output circuit of tube $A^4$. The secondary of the transformer is connected in series with the coils 33 and 34. Another suitable method of operating the recorder is by including in the output circuit of tube $A^4$, a choke coil 54 about which are shunted the coils 33, 34 in series with a condenser 55, as in Fig. 6. These various types of coupling are known and are shown to make it clear that they may be adopted as alternatives without departing from the spirit of the invention. It is also to be understood, that although four amplifier tubes are illustrated, the number and type, as well as the type of circuit may be varied within the scope of this invention.

The operation of the device is as follows:

As the detector mechanism is carried along the trackway, with the brushes 43 and 44 in contact with the track rail, and the cores 37 of the exploring coils in close proximity to the rail, current will flow through the rail between the brushes 43 and 44. The plane of the magnetic field associated with this rail current will be transverse to the axis of the rail, and the flux will interlink with the cores 37. Whenever there is a flaw or variation in the rail, sufficient to cause a variation in the magnetic field surrounding the rail, this variation will cause E. M. F.'s to be induced in the coils 36, 36', and these E. M. F.'s will be amplified by amplifier 35 and transmitted to the coils 33 and 34.

When there is no current supplied to the coils 33 and 34, the armature 18 will be symmetrically located between the polar pieces 17 and 22, and will be held there by the action of the spring support 23 and the biasing spring 25. Consequently, the record 7 made on the chart 5 will be a continuous straight line. When, however, the exploring coils are traversed by induced currents caused by variations in the magnetic field surrounding them, the variations in flux linkage will cause induced current to flow to coils 33 and 34 and distort the magnetic field surrounding the armature 18 and produce a lateral deflection of the pen 8. Consequently, the position of the armature 18 will be changed in accordance with the intensity of the current induced in the coils 33 and 34, and this will produce a record on the chart 5. The amount of movement of pen 8 is roughly proportional to the current flowing in the coils 33 and 34, and to the variation in the magnetic field which produced this current. Consequently, the amplitude of the variation in the record on the chart 5 will vary in approximate proportion to the variations in the magnetic field surrounding the rail 38.

In this way, the record produced on the chart 5 will give an indication of the character and extent of the flaw encountered in the rail, and thus make it possible for the observer to distinguish quite accurately between chart variations resulting from fissures, and those resulting from residual magnetism or other factors. The springs 23 and 25 return the armature 18 to its symmetrical position as soon as the current strength in coils 33 and 34 is reduced below the value necessary to deflect the armature.

Apparatus embodying this invention is not only simplified, due to the omission of all relay circuits, but the record produced on the recording chart is of such a character as to indicate the cause of variations in the magnetic field around the track rails, and thus to make it possible to identify the nature of the flaw without actually examining the rail. Not only is it made unnecessary to examine the rails at all points where indications are made, but the speed of the testing can be considerably increased without in any way impairing the effectiveness of the test.

We are aware of the patent to Herrick, No. 907,235, dated December 22, 1908, wherein a device for testing rail joint conductivity employs a spark discharge for producing a chart record. Testing devices of the character therein shown are not successful because the spark discharge apparatus is too complicated and unreliable to meet the exacting requirements of commercial installations.

Although the apparatus has been shown in connection with one particular form of fissure detector, it is apparent that it may be adapted to use with other forms of apparatus without departing from the spirit and scope of the invention.

We claim as our invention:

1. A galvanometer for use in rail testing comprising, a permanent horseshoe magnet having two opposed polar members; a pole piece carried by each of said members, each pole piece having two spaced polar projections of like polarity contoured to form a chamber between the polar members; a non-magnetic support carried by said pole pieces, said support including a resilient armature supporting member; an elongated armature located between said pole pieces and having its ends in magnetic relation to said polar projections, said armature being centrally attached to said supporting member; resilient means attached to the body of said magnet and to one end of said armature for cooperation with said central armature supporting means to bias said armature to symmetrical position with respect to said polar projections; a pointer carried by said armature; a winding support carried by said non-magnetic support; a winding on said winding support and encircling said armature; and means for energizing said winding to produce deflection of said armature in approximate proportion to the energization thereof.

2. A galvanometer for use in rail testing comprising, a permanent horseshoe magnet having two opposed polar members; a pole piece carried by each of said members, each pole piece having two spaced polar projections of like polarity contoured to form a chamber between the polar members; a non-magnetic support carried by said pole pieces; a substantially flat resilient armature supporting member mounted between said polar projections and extending from one of said polar members to the other; an elongated armature carried by said pole pieces and having its ends in magnetic relation to said polar projections; resilient biasing means attached to the body of said magnet substantially at the base of the horseshoe and having a resilient bar attached to one end of said armature and in substantial axial alignment with it and tending to bias it to a symmetrical position with respect to said polar projections; an elongated indicating pointer attached to the other end of said armature in substantial axial alignment therewith and extending outwardly therefrom to cause said armature to be located substantially midway between the free end of said pointer and the point of attachment of said resilient bar to said magnet; a winding support carried by said non-magnetic support within the chamber defined by said polar projections and encircling said armature; a winding on said winding support; and means for energizing said winding to produce deflection of said armature against the action of the field of said magnet and the biasing means.

DAVID C. BETTISON.
FRANK H. KEATON.